United States Patent [19]
Fujimura et al.

[11] Patent Number: 5,963,528
[45] Date of Patent: Oct. 5, 1999

[54] DISC APPARATUS HAVING A COVER WHICH OPENS BY BEING LINKED WITH A MOVEMENT OF A DISC TRAY

[75] Inventors: Nobuhiko Fujimura, Hachioji; Nobuki Matsui, Oume, both of Japan

[73] Assignee: Teac Corporation, Tokyo, Japan

[21] Appl. No.: 08/965,125

[22] Filed: Nov. 6, 1997

[30]     Foreign Application Priority Data

Nov. 8, 1996  [JP]  Japan .................................. 8-296762

[51] Int. Cl.$^6$ .................................................. G11B 33/02
[52] U.S. Cl. ........................................ 369/77.1; 369/75.2
[58] Field of Search ................................ 369/75.1, 75.2, 369/77.1, 77.2; 360/99.06; 312/8.12, 8.15

[56]            References Cited

U.S. PATENT DOCUMENTS

| | | | |
|---|---|---|---|
| 4,368,495 | 1/1983 | Hamanaka et al. ........................ | 360/97 |
| 4,600,247 | 7/1986 | Einhaus ........................................ | 312/8 |
| 4,682,319 | 7/1987 | Einhaus ...................................... | 369/75.2 |
| 5,065,004 | 11/1991 | Mizuno et al. ........................... | 235/479 |
| 5,517,478 | 5/1996 | Park ............................................. | 369/77.2 |
| 5,831,956 | 11/1998 | Sawai et al. ............................. | 369/75.2 |

*Primary Examiner*—Stuart S. Levy
*Assistant Examiner*—Kenneth W. Fields
*Attorney, Agent, or Firm*—Michael N. Meller

[57]            ABSTRACT

In a disc apparatus, an insertion or removal operation of a disc can be performed without drawing the entire tray from the disc apparatus. A tray is movable between a disc loading position and a disc exchanging position. The tray is located in the disc apparatus so that a disc placed on the tray is loaded to the disc apparatus when the tray is at the disc loading position. A portion of the tray is drawn from the disc apparatus so that the disc can be placed on or removed from the tray when the tray is at the disc exchanging position. A cover is provided above the tray so as to enclose the tray when the tray is at the first position. A cover opening mechanism opens the cover by being linked with a movement of the tray in a direction from the disc loading position to the disc exchanging position.

7 Claims, 13 Drawing Sheets

DISC APPARATUS HAVING A COVER WHICH OPENS BY BEING LINKED WITH A MOVEMENT OF A DISC TRAY

BACKGROUND OF THE INVENTION

1. Field of the Invention

The present invention relates to a disc apparatus and, more particularly, to a disc apparatus used as a portable CD-ROM drive apparatus.

2. Description of the Related Art

Conventionally, a compact disc (12 cm or 8 cm diameter) which is referred to as a CD-ROM is used as a recording medium for storing information such as a database or software. In order to incorporate the CD-ROM into a miniaturized notebook type personal computer, a built-in type CD-ROM drive apparatus, which is incorporated into a housing, has been developed.

In a conventional disk apparatus, a tray for accommodating a disc is driven by a motor. The disc is placed on the tray when the tray is moved out of a housing of the disc apparatus. Then, the tray is returned to a position inside the housing by a drive force of the motor.

In the apparatus of a type in which the tray is moved by the motor, the motor for driving the tray and a transmission mechanism for transmitting a drive force to the tray are needed. This is an obstacle for reduction in size and thickness of the apparatus.

Japanese Laid-Open Patent Application No.7-235111 discloses a disc apparatus which eliminates a tray driving motor and a transmitting mechanism by manually moving the tray to a disc loading position within a housing or a disc changing position outside the housing.

In the above-mentioned patent document, since an optical pickup and a pickup drive motor are mounted on a bottom surface of the tray, the optical pickup and the pickup drive motor, which have a relatively large weight, are moved outside the housing in relation to the movement of the tray when the tray is drawn outside the housing. Accordingly, when the tray is drawn outside the housing, the center of gravity moves outside the housing, which results in an inclination of the entire apparatus in a direction of drawing the tray, i.e., the outward movement direction of the tray. Thus, there is a problem in that stability of the apparatus is lost.

Additionally, if the tray is inclined due to the movement of the center of gravity, the apparatus may wobble, and thus there is a problem in that a placing or removing operation of the disc is difficult.

SUMMARY OF THE INVENTION

It is an object of the present invention to provide an improved and useful disc apparatus in which the above-mentioned problems are eliminated.

A more specific object of the present invention is to provide a disc apparatus in which a placing or removing operation of a disc can be performed without drawing the entire tray from the disc apparatus.

Another object of the present invention is to provide a disc apparatus having a cover which is prevented from being open when a disc is loaded so as to protect the loaded disc.

A further object of the present invention is to provide a disc apparatus having a cover which is prevented from being swung, is and also prevented from being closed when the disc is being changed or unintentionally opened after the disc is loaded.

In order to achieve the above-mentioned objects, there is provided according to the present invention a disc apparatus comprises:

a tray which is movable between a first position and a second position, the tray being located in the disc apparatus so that a disc placed on the tray is loaded to the disc apparatus when the tray is at the first position, a portion of the tray being drawn from the disc apparatus so that the disc can be placed on the tray when the tray is at the second position and also removed from the tray when the tray is at the second position;

a cover provided above the tray so as to enclose the tray when the tray is at the first position; and a cover opening mechanism which opens the cover by being linked with a first movement of the tray in a direction from the first position to the second position.

According to the above-mentioned invention, the cover is opened by being linked with the movement of the tray from the first position at which the tray is located inside the apparatus to the second position at which a portion of the tray is drawn from the apparatus. Thus, a large part of the tray can be exposed by cooperation of the opening of the cover and the drawing of the tray. Accordingly, a disc can be placed on the tray or removed from the tray without drawing the entire tray as is in the conventional apparatus. Additionally, since an amount of shift of the center of gravity is reduced due to drawing of the tray, stability of the apparatus during a drawing operation of the tray can be maintained. This facilitates placement and removal of a disc.

Additionally, the cover opening mechanism may also close the cover by being linked with a second movement of the tray in a direction from the second position to the first position.

The disc apparatus according to the present invention may further comprises:

an engaging mechanism which holds the tray at the first position;

a switch adapted to be operated by a user; and a disengaging mechanism which releases an engagement of the tray by the engaging mechanism, the engagement being released when the switch is operated.

Additionally, the cover opening mechanism may include a cover locking mechanism which restricts an opening operation of the cover when the tray is located at the first position. Thus, the cover is prevented from being opened when the disc is loaded on the apparatus, resulting in protection of the disc placed on the tray.

Further, the cover opening mechanism may include a cover urging mechanism which urges the cover toward a closed position when the tray is located at the first position and urges the cover toward a full open position when the tray is located at the second position. Thus, the cover is firmly held at the closed position or the full open position, resulting in prevention of swing of the cover. Additionally, the cover is prevented from being closed during an exchanging operation of the disc or is prevented from being unintentionally opened after the disc is loaded.

In one embodiment of the present invention, the cover may be opened by a rotating movement generated by the cover opening mechanism.

Additionally, the cover opening mechanism may include:

a first gear member mounted to the cover;

a cam groove provided to the tray; and a second gear member engaged with the first gear member, the second gear member having a pin being engaged with the cam groove so as to generate a rotation of the second gear member.

In one embodiment according to the present invention, the tray may be provided with a turntable, a motor for rotating the turntable and a clamp mechanism which clamps the disc on said turntable.

Other objects, features and advantages of the present invention will become more apparent from the following detailed description when read in conjunction with the accompanying drawings.

DETAILED DESCRIPTION OF THE PREFERRED EMBODIMENT

A description will now be given, with reference to the drawings, of an embodiment of the present invention.

Figure 1:
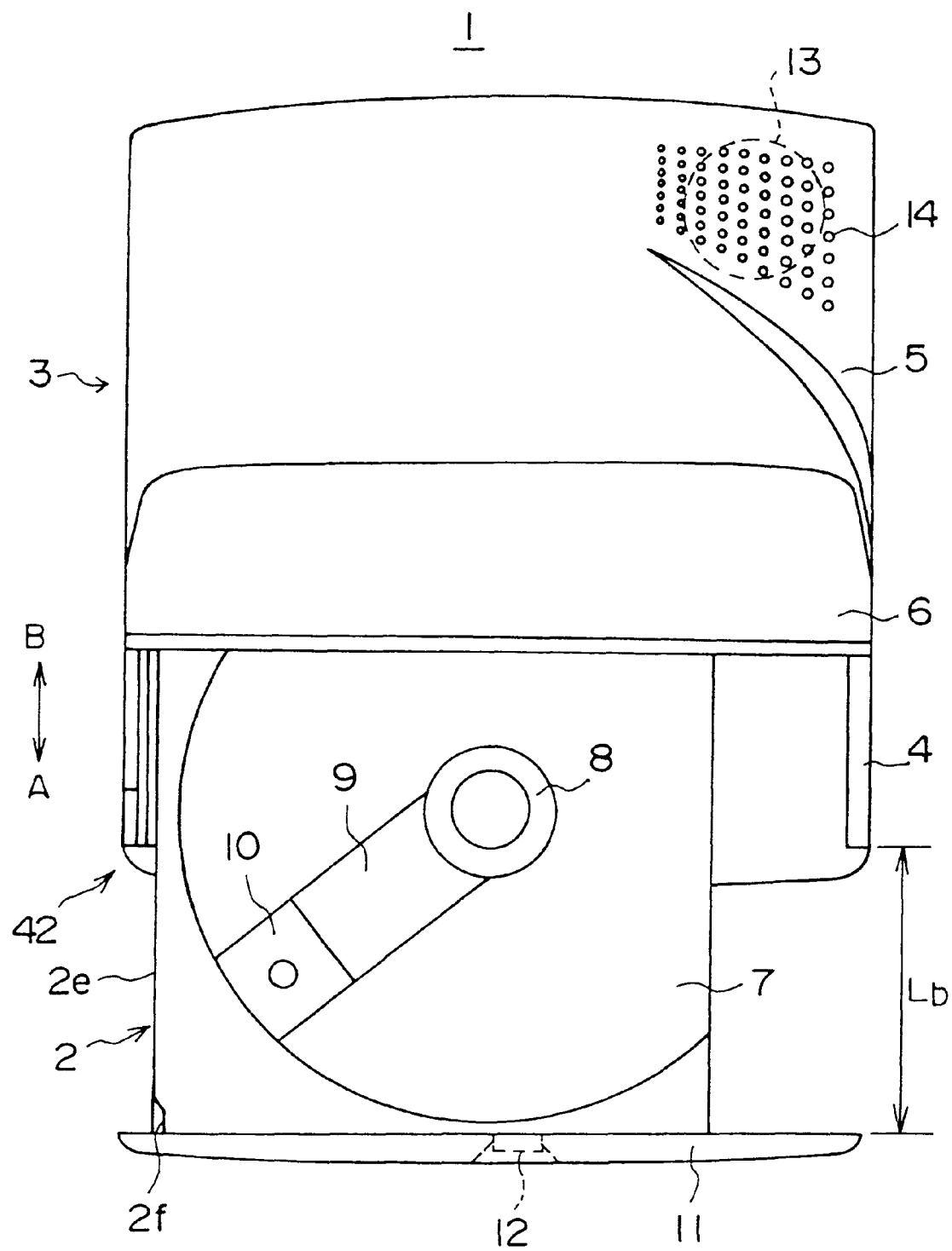
FIG. 1 is a plan view of a disc apparatus according to an embodiment of the present invention when a tray is drawn.
Figure 2:
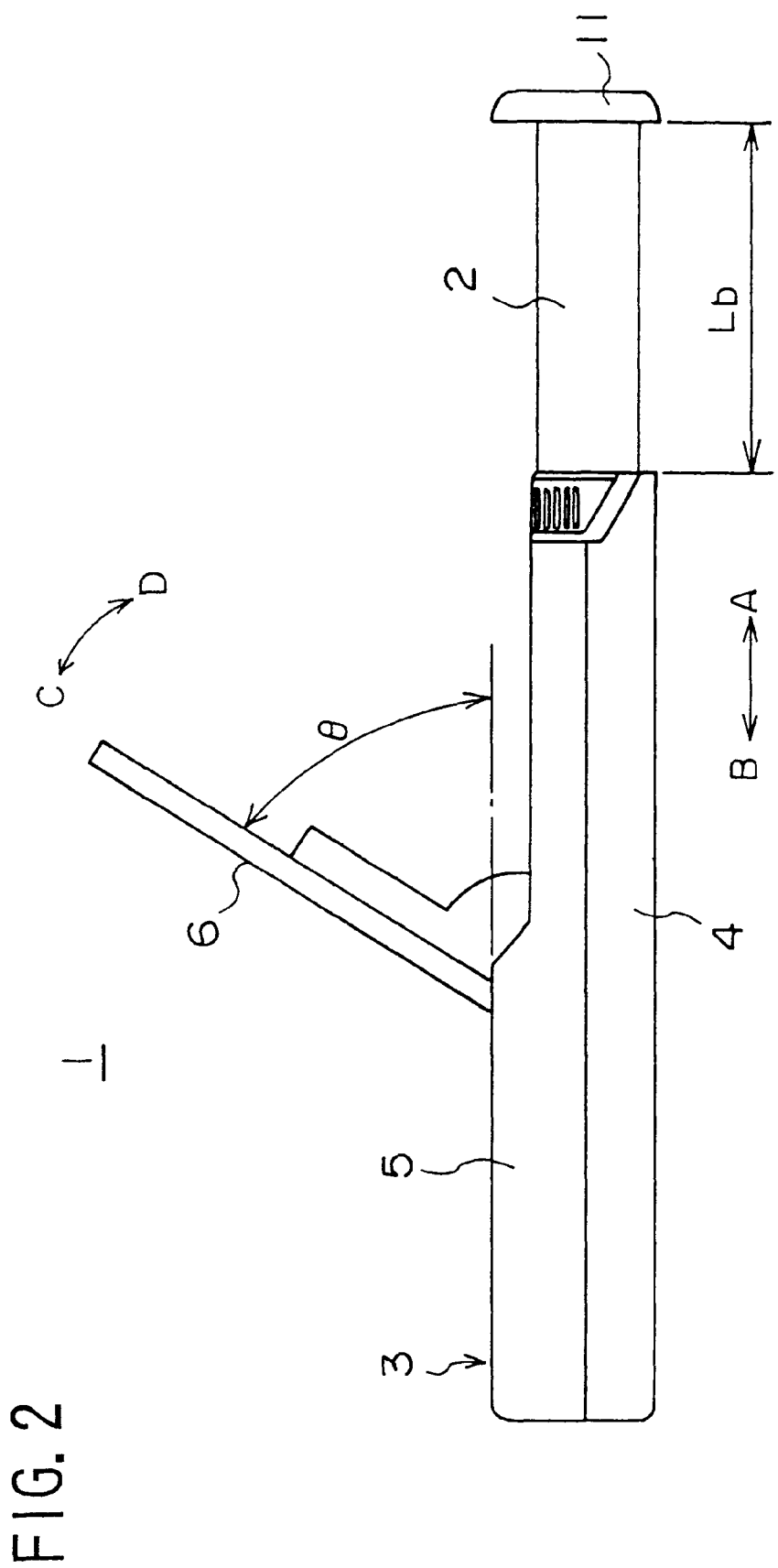
FIG. 2 is a side view of the disc apparatus when the tray is drawn.

FIG. 1 is a plan view of a CD-ROM drive apparatus according the embodiment of the present invention in a state where a tray is drawn; FIG. 2 is a side view of the CD-ROM drive apparatus in the state where the tray is drawn.

The CD-ROM drive apparatus 1 (hereinafter may be referred to as apparatus 1) is a disc apparatus connected to a personal computer (not shown in the figurer) so as to serve as an external storage device.

The apparatus 1 is provided with a movable tray 2 for receiving a disc (not shown in the figure). A housing 3 which accommodates the tray 2 comprises a lower cover 4 which covers the lower side of the tray 2, an upper cover 5 which covers the upper side of the tray 2 and an open/close cover 6 which can be opened and closed.

The open/close cover 6 opens by being linked with movement of the tray being drawn in a direction indicated by arrow A. Accordingly, despite a travel distance of the tray 2 being small, a disc placing portion 7 formed in an upper surface of the tray 2 can be easily accessed due to a large opening provided by the open/close cover 6 being open. Thus, a placing or insertion operation or a removal operation of a disc can be performed without drawing the entire tray 2 from the housing 3.

Additionally, the center of gravity does not move outside the housing 3 when the tray 2 moves to a disc exchanging position where the tray 2 is drawn to the end since the travel distance of the tray 2 is small. Accordingly, the shift in the center of gravity due to a drawing operation of the tray 2 is small, and the stability of the apparatus 1 is maintained when the tray 2 is drawn. Thus, a placing or insertion operation or a removal operation of the disc can be performed easily. Additionally, when the apparatus 1 is placed and used in a narrow space, the disc exchanging operation can be easily performed.

A turntable 8 which clamps the disc is provided in the center of the disc placing portion 7. Additionally, the disc placing portion 7 is provided with an opening 9 which extends in a radial direction, and an optical pickup 10 is mounted under the disc placing portion 7. The optical pickup 10 is movable along the opening 9. Further, a front bezel 11 is mounted on a front end of the tray 2.

Figure 3:
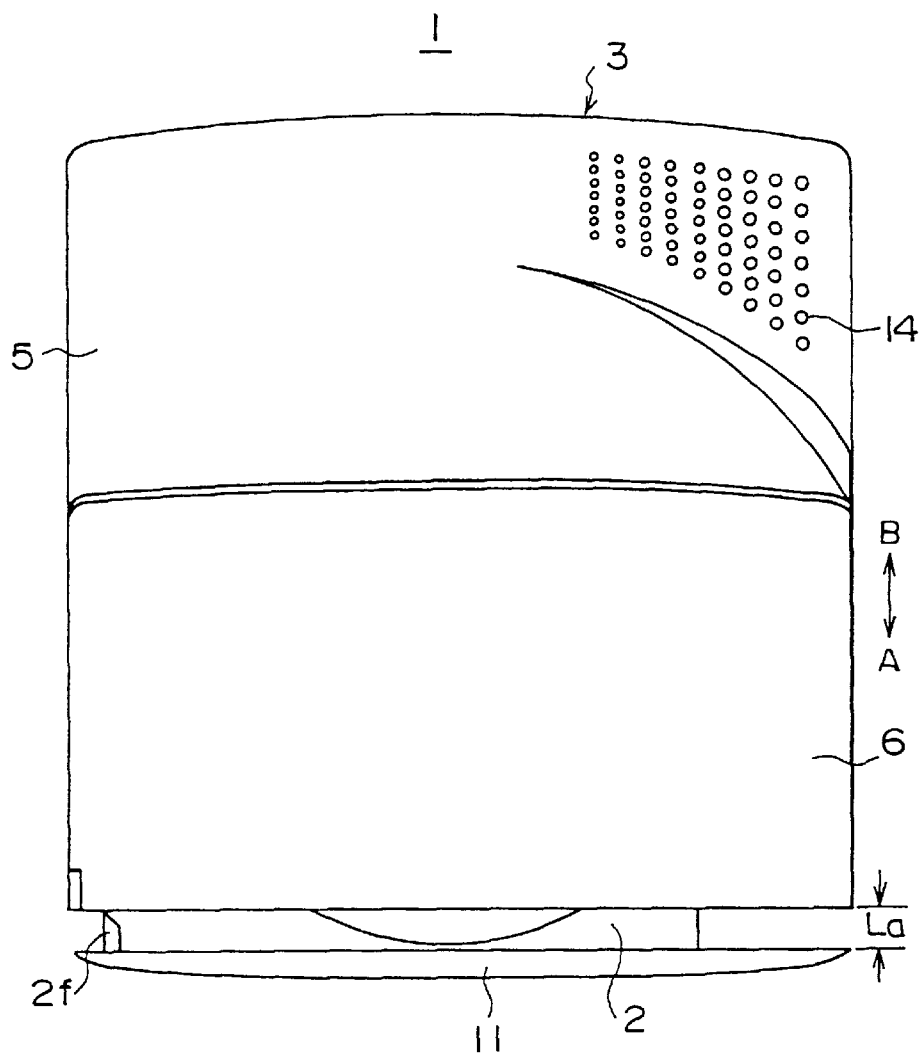
FIG. 3 is a plan view of the disc apparatus when the tray is moved by a predetermined distance.
Figure 4:
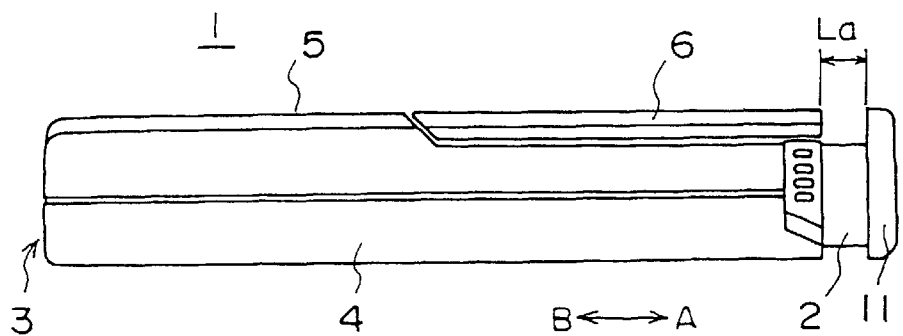
FIG. 4 is a side view of the disc apparatus when the tray is moved by the predetermined distance.

An eject button 12 is provided in a center recess 11a of the front bezel 11 of the tray 2. When the eject button 12 is pressed, an engagement of the tray 2 is released, and the tray 2 is pressed out in the direction of the arrow A as shown in FIGS. 3 and 4. Thereby, the front bezel 11 moves to a position away from the front end of the housing 3 by a predetermined distance La. In order to prevent the eject button from being operated while the disc is played, the eject button 12 is provided in the center recess 11a of the front bezel 11.

Figure 5:
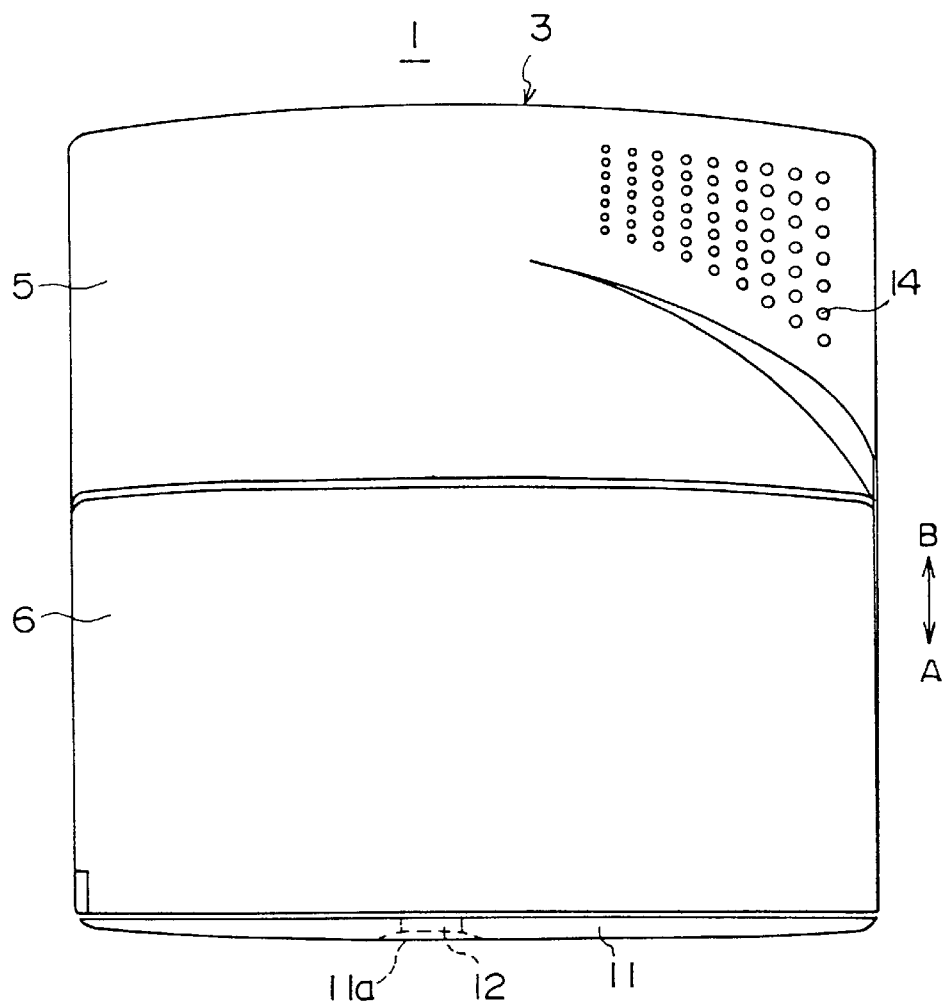
FIG. 5 is a plan view of the disc apparatus when the tray is retracted.
Figure 6:
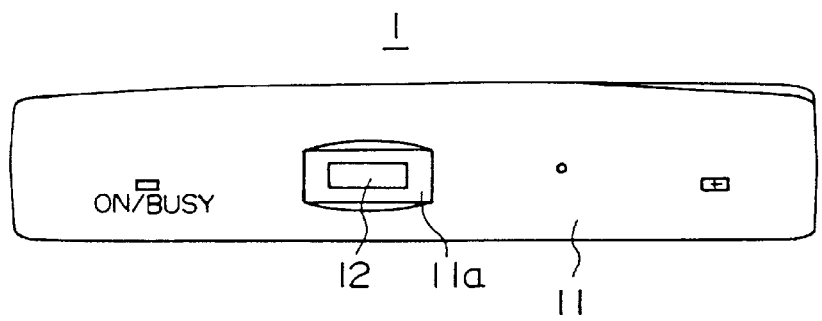
FIG. 6 is a front view of a front bezel.

After the engagement of the tray 2 is released by the operation of the eject button 12, the tray 2 is manually moved in the direction A by a predetermined distance Lb from the front end of the housing 3, and reaches the disc exchanging position as shown in FIGS. 1 and 2. After the disc is exchanged, the tray 2 is pushed back in a direction B and returns to a disc loading position as shown in FIGS. 5 and 6.

When the tray is moved, the open/close cover 6 rotates in an opening direction (direction C in FIG. 2) by being linked with movement of the tray 2 in the direction A, and rotates in a closing direction (direction D in FIG. 2) by being linked with movement of the tray 2 in the direction B. When the tray 2 is drawn to the disc exchanging position, the open/close cover 6 rotates to the a full open position where the open/close cover 7 is rotated through an angle θ in the opening direction (direction C) as shown in FIG. 2. By the open/close cover 6 being opened, the disc placing portion 7 formed in the upper surface of the tray 2 is fully accessible due to a large opening, and thus the disc is easily placed on or removed from the tray 2. Additionally, since the open/close cover 6 is linked with the tray 2, the tray 2 is returned to the disk loading position when the open/close cover 6 is closed from the full open position as shown in FIGS. 3 and 4. Additionally, a speaker 13 is provided on an inner surface of the upper cover 5. A number of small openings 14 are formed on the upper cover 5 in a position opposite to the speaker 13 so as to transmit sound from the speaker.

Figure 7:
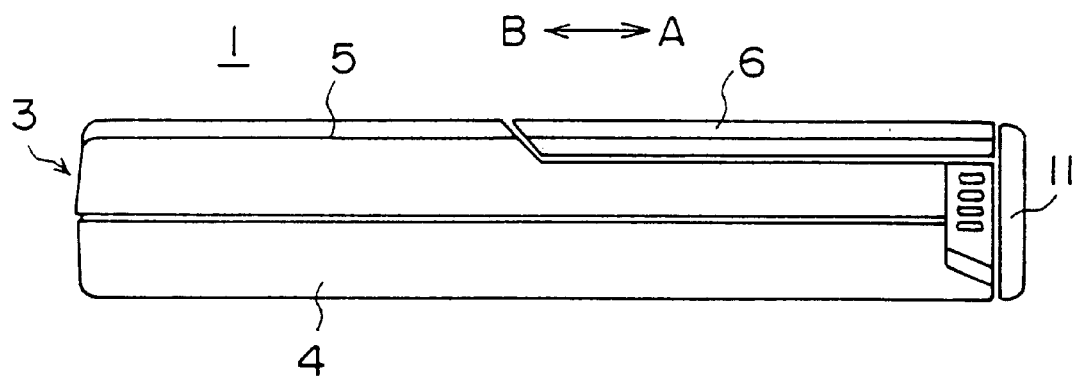
FIG. 7 is a left side view of the disc apparatus when the tray is retracted.
Figure 8:
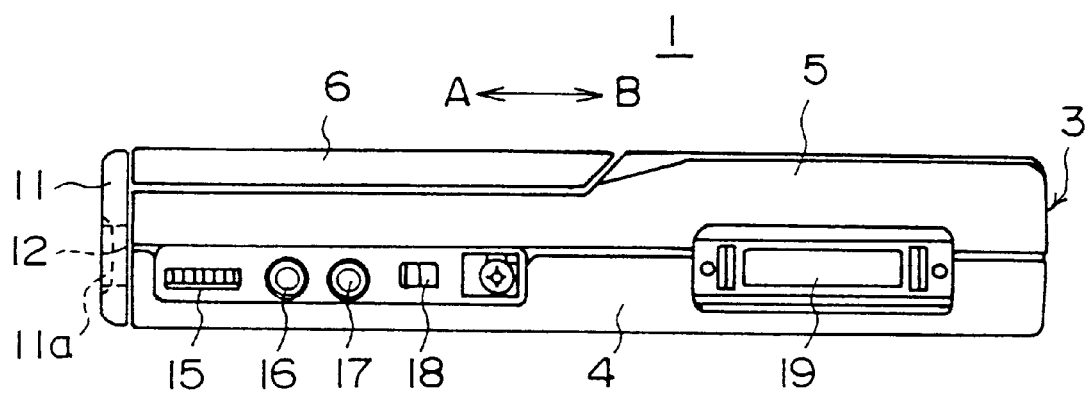
FIG. 8 is a right side view of the disc apparatus when the tray is retracted.

FIG. 7 is a left side view of the apparatus 1 in a state in which the tray 2 is located in the housing 3 and the open/close cover 6 is closed; FIG. 8 is a right side view of the apparatus 1 in a state in which the tray 2 is located in the housing 3 and the open/close cover 6 is closed.

In a state in which the tray is located in the housing 3, the open/close cover 6 and the front bezel 11 are positioned so that they do not protrude from the housing 3. Accordingly, when the disc is loaded, the housing 3 is sealed by the open/close cover 6 and the front bezel 11 so that dust does not enter through a gap between the open/close cover 6 and the front bezel 11.

The right side of the housing 3 is provided with a volume control knob 15, an earphone jack 16, a line out jack 17, a power switch 18 and an interface connector 19.

Figure 9:
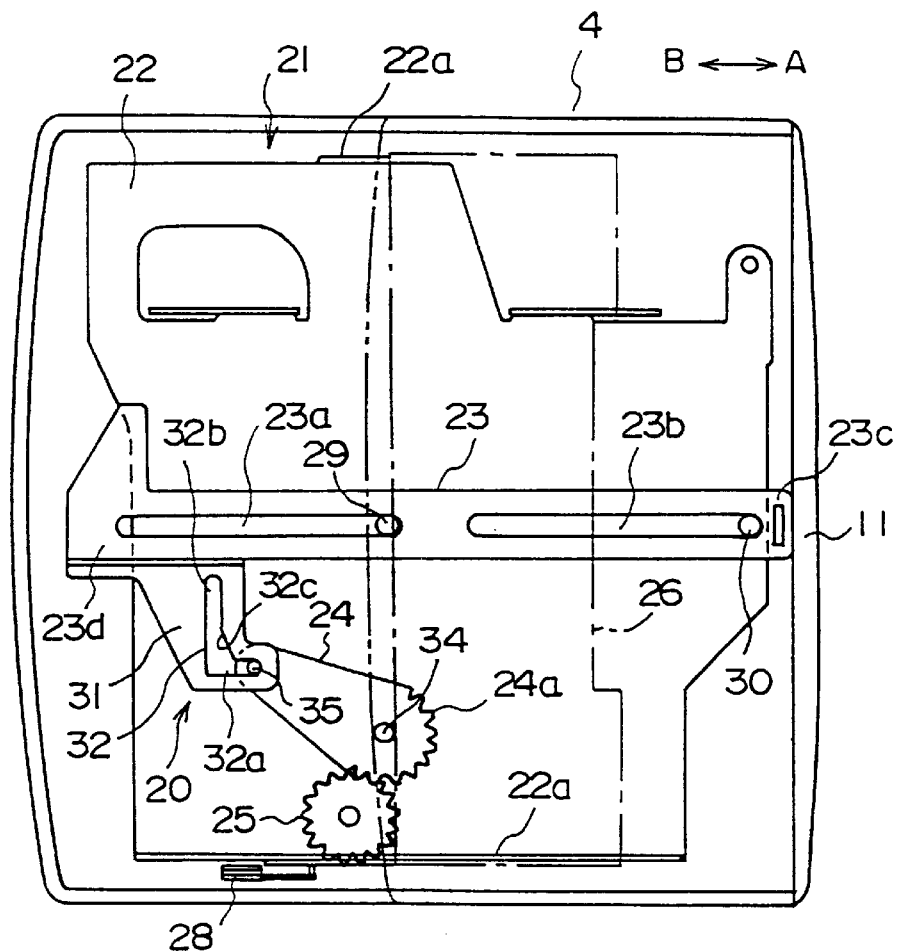
FIG. 9 is a plan view of a link mechanism when the tray is retracted.
Figure 10:
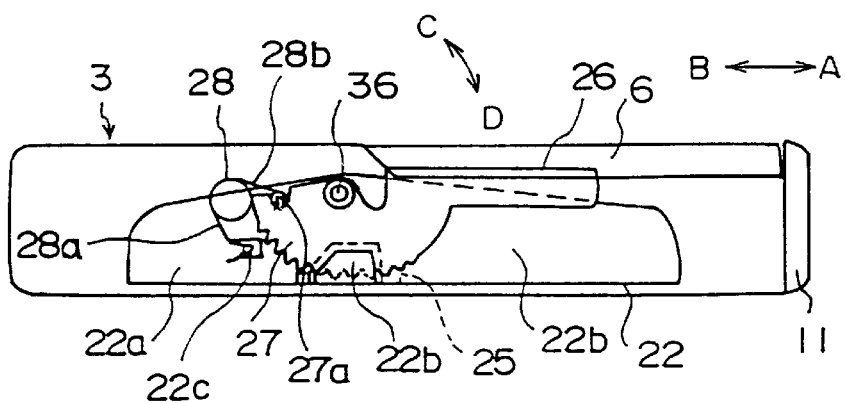
FIG. 10 is a side view of the link mechanism when the tray is retracted.

A description will now be given of a link mechanism 21 which links the tray 2 and the open/close cover 6 in the housing 3. FIG. 9 is a plan view of the link mechanism 21 provided under the tray 2; FIG. 10 is a side view of the link mechanism 21.

The link mechanism 21 comprises a base 22 which is mounted on the lower cover 4 and supports each part of the link mechanism, a slide member 23 which slides on the base 22 in the directions A and B; an arm member 24 which rotates in relation to the sliding motion of the slide member 23; a transmission gear 25 which engages with a gear 24a of the arm member 24; a cover frame 26 which supports the open/close cover 6; a frame gear 27 which is provided on a side of the cover frame 26 and engages with the transmission gear 25; and a torsion spring (cover urging mechanism) 28 which urges the cover frame 26 toward an opening position. The frame gear 27 is formed in a vertical plane whereas the transmission gear 25 is mounted on a horizontal plane. That is, the frame gear 27 is engaged with the transmission gear 25 in an orthogonal relationship to each other.

The slide member 23 is provided with elongated openings 23a and 23b in which guide pins 29 and 30 are received, respectively. The guide pins 29 and 30 are provided in a center portion of the base 22. The slide member 23 slidably moves in the directions A and B by being guided by the guide pins 29 and 30. A front end 23c of the slide member 23 is fixed to an inner surface of the front bezel 11. Accordingly, the slide member 23 serves as a guide member for guiding a direction of movement of the front bezel 11.

Additionally, the slide member 23 includes a cam portion 31 which extends toward a rear end 23d and along one side of the slide member 23. The cam portion 31 has a cam groove 32 having an L-shape. The cam groove 32 includes a first cam groove 32a which extends in the directions A and B, a second cam groove 32b which extends in a direction perpendicular to the directions A and B, and a slanted cam 32c which is slanted with respect to the first cam groove 32a and the second cam groove 32b.

The arm member 24 is rotatably supported by a shaft 34 which is perpendicularly mounted on the base 22. A pin 35 is provided on an end of the arm member, the pin being received in the cam groove 32. The pin 35 fits in the first cam groove 32a when the tray 2 is at the disc loading position. Thus, the arm member 24 is prevented from being rotated by an engagement between the pin 35 and the cam groove 32a.

The transmission gear 25 which engages with the gear 24a of the arm member 24 is engaged with the frame gear 27 provided on a side of the cover frame 26. Accordingly, a rotation of the cover frame 26 is linked with a rotation of the arm member 24. Thus, when the tray 2 is at the disc loading position, the cover frame 26 is locked to prevent rotation since the arm member 24 is not rotatable, resulting in a protection of the disc being loaded. Accordingly, a cover lock mechanism 20 is constituted by the cam groove 32, the arm member 24, the transmission gear 25 and the cover frame 26. The cover frame 26 is rotatably supported in the directions C and D by a shaft 36 provided on bracket portions 22a which are perpendicularly formed on both sides of the base 22. The frame gear 27 is inserted between one of the bracket portions 22a and a bent portion 22b which is bent on the outside of the bracket portion 22a so that the frame gear 27 does not fall off from the shaft 36.

One end 28a of the torsion spring 28 is engaged with an engaging portion 22c of the bracket portion 22a, and the other end 28b of the torsion spring 28 is engaged with an engaging portion 27a of the frame gear 27. As shown in FIG. 10, when the tray 2 is located at the disc loading position, the engaging portion 27a of the frame gear 27 is located above a line connecting the shaft 36 and the engaging portion 22c. Thereby, a spring force of the spring 28 acts to rotationally urge the engaging portion 27a of the frame gear 27 in a clockwise direction about the shaft 36.

Accordingly, the open/close cover 6 mounted on the cover frame 26 is rotationally urged by the torsion spring 28 in the opening direction. Thus, the torsion spring 28 maintains the open/close cover 6 in the closed position so that the open/close cover 6 does not open due to vibration during transportation.

Figure 11:
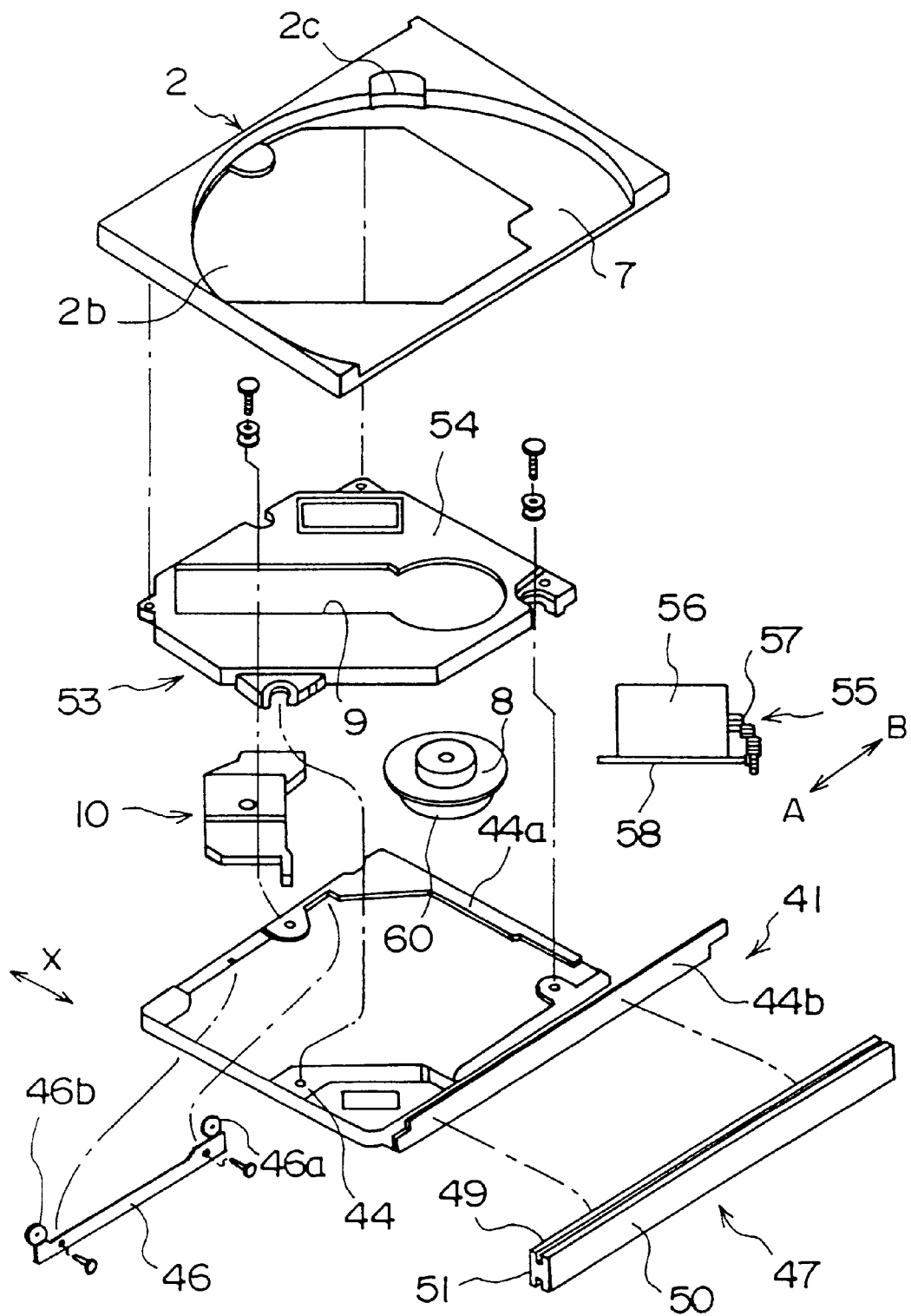
FIG. 11 is an exploded perspective view of the tray, a sub-chassis and a pickup drive unit.
Figure 12:
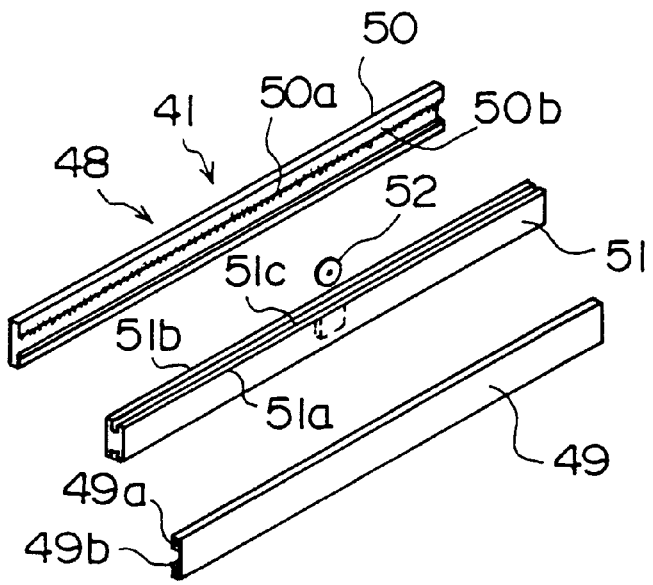
FIG. 12 is an exploded perspective view of a guide rail mechanism, a main chassis and a front bezel.
Figure 12:
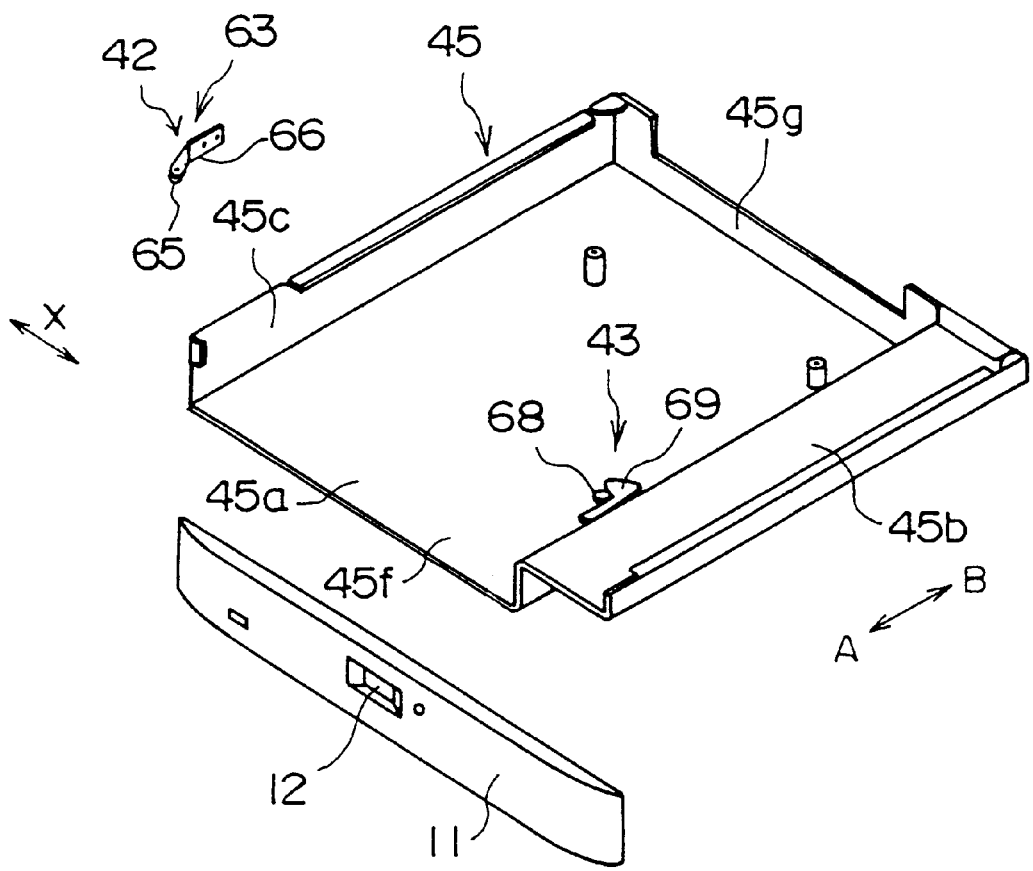

A description will now be given of a guide mechanism 41 which guides a sliding motion of the tray 2 and a tray lock mechanism 43 which locks the tray 2 when the tray 2 is at the disc loading position. FIGS. 11 and 12 are exploded perspective views of the apparatus 1.

The tray 2 is movably supported by the guide mechanism 41 in the direction A or B in a state where the tray 2 is supported by the sub-chassis 44. The tray 2 is formed in a size in which a width of the tray 2 is less than the diameter of the disc so that a portion of the disc protrudes from the tray 2. Accordingly, when the tray 2 moves in the direction A or B to the disc exchanging position or the disc loading position, the tray 2 is guided by the guide mechanism 41.

The eject button 12 which is provided in the center of the front bezel 11 is pressed so as to release the tray from a locked position maintained by the tray lock mechanism 43 when the tray 2 is drawn. Thus, if the eject button 12 is operated when the tray is located in the housing 3 as shown in FIG. 5, the locking of the tray 2 by the tray lock mechanism is released. Thereby, the front bezel 11 protrudes in the direction A by a distance La (for example, 5 to 10 mm) so as facilitate a drawing operation of the tray 2.

The sub-chassis 44 comprises a frame member 44a which has an opening for the optical pickup portion 10 and the turntable 8 and on which the tray 2 is placed; a bracket 44b which is provided on the right side surface of the frame member 44a and extends in the directions A and B; and a guide rail pressing member 46 secured by screws to a left side surface 44c of the frame member 44a. The main chassis 45 is fixed on the base 22 which is mounted to the lower cover 4. The main chassis comprises an accommodating portion 45a which accommodates the above-mentioned mechanisms and a cover portion 45b which covers a part of the disc which protrudes from the tray so as to protect the part of the disc.

As shown in FIGS. 12 to 15, the tray guide mechanism 41 includes a pair of guide rail mechanisms 47 and 48 which are mounted on both sides of the sub-chassis 44. Each of the pair of guide rail mechanisms 47 and 48 comprises a movable side rail 49 which is fixed to the bracket 44b of the sub-chassis 44; a fixed side rail 50 which extends parallel to the movable side rail 49; and a slide rail 51 which is provided between the movable side rail 49 and the fixed side rail 50 and movably engages with each of the movable side rail 49 and the fixed side rail 50.

Each of the movable side rail 49 and the fixed side rail 50 has a C-shaped cross section, and has edge portions 49a and 50a, respectively, which are bent inwardly. A rack 49b which extends in a longitudinal direction of the movable side rail 49 is formed on the lower edge portion 49a. A rack 50b which extends in a longitudinal direction of the fixed side rail 50 is formed on the upper edge portion 50a.

The slide rail 51 has a H-shaped cross section, and comprises a first rail 51a which engages with the edge portions 49a of the movable side rail 49 and a second rail 51b which engages with the edge portions 50a of the fixed side rail 49. The first rail 51a and the second rail 51b are connected by a middle portion so that a groove 51c is formed between the first rail 51a and the second rail 51b. A pinion 52 is rotatably provided in an opening formed in the middle portion of the slide rail 51 at the center in a longitudinal direction of the slide rail 51. The upper side of the pinion 52 is engaged with the rack 49b of the movable side rail 49, and the lower side of the pinion 52 is engaged with the rack 50b of the fixed side rail 50. In the guide rail mechanism 47, the movable side rail 49 is mounted to a side wall 45c of the main chassis by screws, and the fixed side rail 50 is mounted, by screws, to the bracket 44b of the sub-chassis 44 which supports the tray 2.

Accordingly, when the tray 2 is drawn, the fixed side rail 50 slides on the slide rail 51 in the direction A while rotating the pinion 52. The slide rail also moves relative to the movable side rail 49 in the direction A.

The movable side rail 49 of the guide rail mechanism 48 is mounted to pressing portions 46a and 46b of the guide rail pressing member 46 which is mounted on the sub-chassis 44. The pressing portions 46a and 46b are formed by bending in a crank shape so that the pressing portions 46a and 46b serve as leaf springs. That is, the pressing portions 46a and 46b are deformed to be elastically bent outwardly when guide rail pressing member 46 is mounted to the movable side rail 49.

Accordingly, the movable side rail 49 is pressed by an elastic restoring force of the pressing portions 46a and 46b in the direction X which is perpendicular to the direction A or B, and thus a play in the side direction is eliminated. Additionally, allowable tolerances of the main chassis 45 and the sub-chassis 44 can be absorbed by the pressing portions 46a and 46b. Further, since the slide rail 51, which is provided between the fixed side rail 50 and the movable side rail 49 is slidably engaged with the fixed side rail 50 and the movable side rail 49, play in the side directions is eliminated by pressing the movable side rail 49 in the direction X. Thus, a smooth drawing operation of the tray 2 can be achieved.

Figure 15:
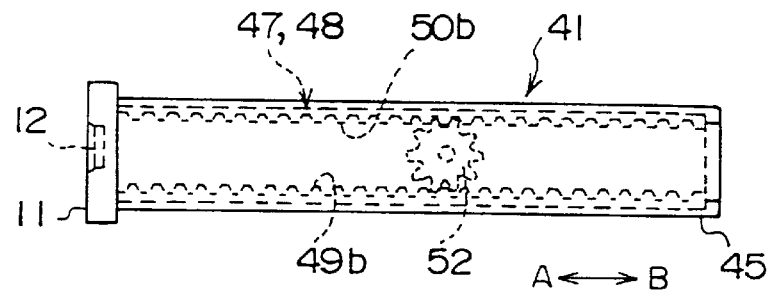
FIG. 15 is a side view of a guide rail mechanism.

As mentioned above, the tray 2 is guided by the guide rail mechanisms 47 and 48 which are provided between both sides of the sub-chassis 44 and the side walls 45c and 45d of the main chassis 45. When the tray 2 is at the disc exchanging position, the rails 49, 50 and 51 are located in the main chassis 45 as shown in FIG. 15. When the tray 2 is drawn in the direction A, the slide rail 51 moves relative to the fixed side rail 50 in the direction A by a predetermine distance, and the movable side rail 49 is moved relative to the slide rail 51 in the direction A by a predetermined distance.

Figure 16:
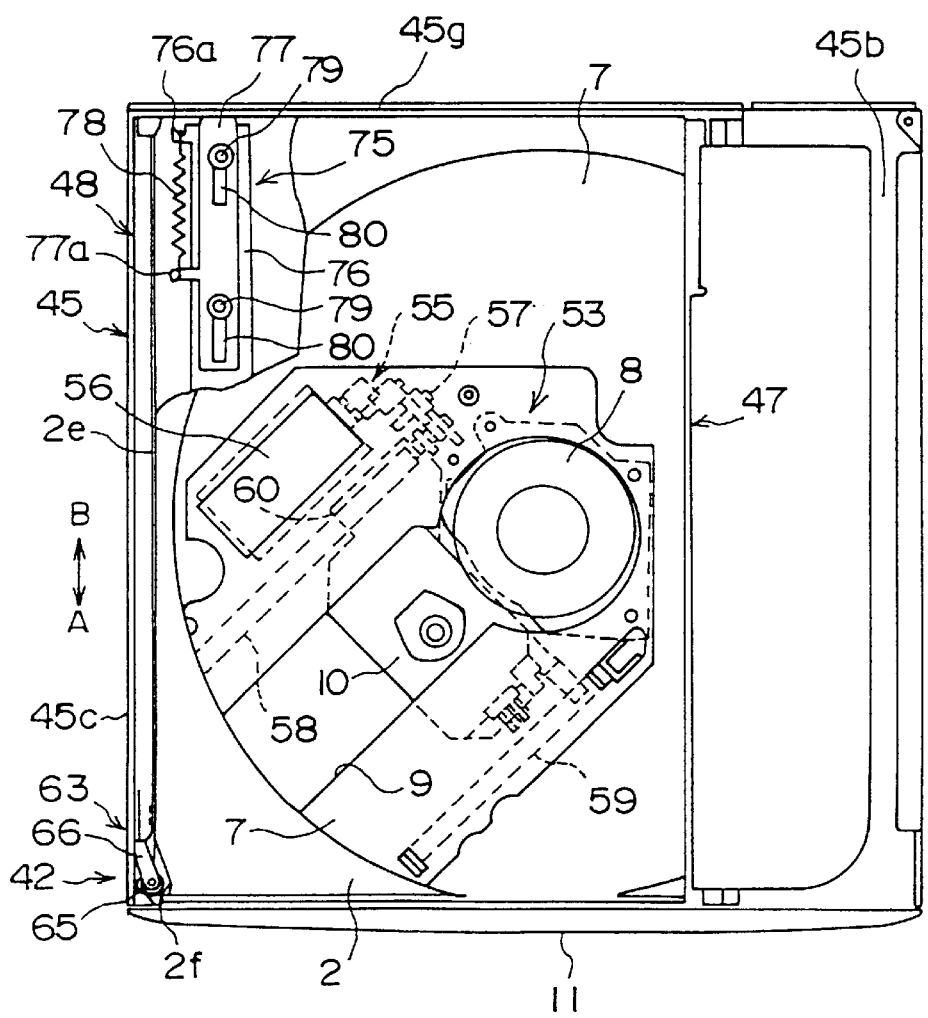
FIG. 16 is a plan view of a pickup drive unit and a tray push mechanism.

Additionally, as shown in FIGS. 11 and 16, a drive unit 53 is provided above the sub-chassis 44, the drive unit having the optical pickup 10 and the turntable 8. The drive unit 53 comprises a base 54 which is fixed to the sub-chassis 44, the optical pickup 10 mounted on the base 54, a pickup drive unit 55 which moves the optical pickup 10 in a radial direction and a base 53 mounted to the turntable 8.

The pickup drive unit 55 comprises a pickup drive motor 56 mounted on a lower surface of the base 54, a transmission mechanism 57 comprising a plurality of gears, a lead screw 58 which is driven via the transmission mechanism 57, and a guide shaft 59 which extends parallel to the lead screw 58 so as to guide the optical pickup 10. Accordingly, the optical pickup 10 faces the opening 9 which extends in a radial direction of the disc, and is guided by the lead screw 58 and the guide shaft 59 on both sides.

Since the optical pickup 10 includes an engaging portion 60 which engages a screw portion of the lead screw 58, the optical pickup 10 moves in a radial direction of the disc when the lead screw 58 is rotated by the pickup drive motor 56.

The turntable 8 is provided with a turntable drive motor 60. The turntable drive motor 60 rotates the disc clamped on the turntable 8 after the tray 2 reaches a predetermined position in the apparatus 1.

As shown in FIG. 16, the engaging member 63 comprises a roller which rolls on a side wall 2e of the tray 2 and a roller support member 66 which rotatably supports the roller 65. The roller 65 fits in a recess 2f provided on the side wall 2 when the tray 2 is located at the disc exchanging position so as to restrict movement of the tray 2.

One end 66a of the roller support member 66 is mounted to a side wall 45c of the main chassis 45 by a rivet, and the roller 65 is rotatably supported by an arm portion 66b of the roller 66. The arm portion 66b of the roller support member 66 presses the roller 65 against the side wall 2e. That is, the roller support member 66 rotatably supports the roller 65, and also serves as a leaf spring which processes the roller 65 against the side wall 2e of the tray 2. Thus, the roller 65 falls into the recess 2f due to a pressing force of the roller support member 66 position when the tray 2 is moved and reaches the disc exchanging position. Thus, the tray 2 is maintained at the disc exchanging position.

Figure 13:
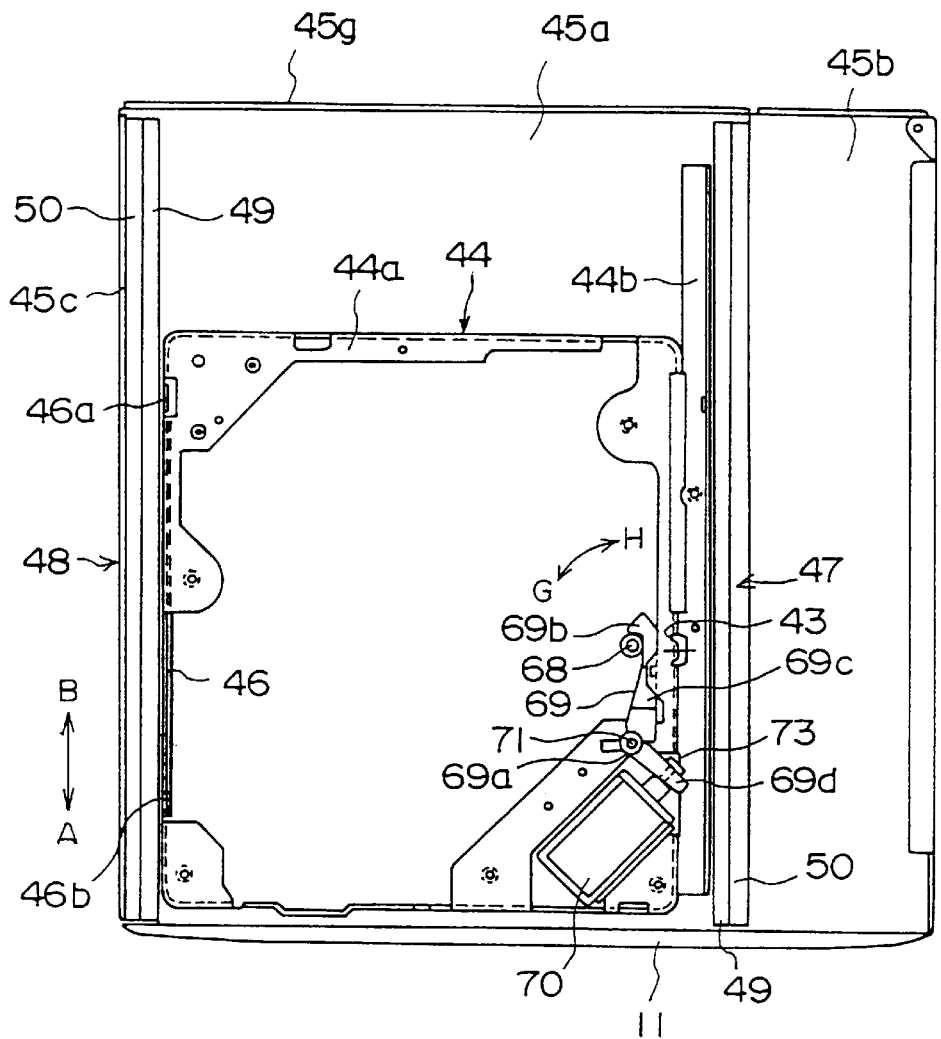
FIG. 13 is a plan view of a tray lock mechanism.
Figure 14:
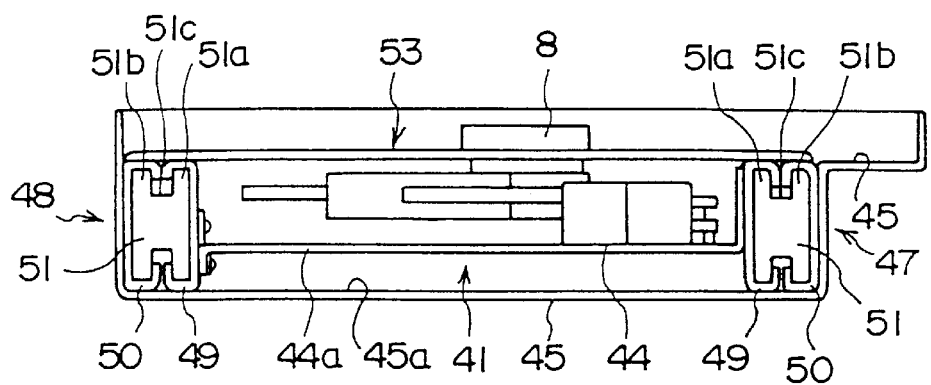
FIG. 14 is a plan view of a guide rail mechanism.

As shown in FIGS. 12 and 13, the tray lock mechanism 43 is provided on a mount portion 44c of the frame member 44a of the sub-chassis 44. The tray lock mechanism 43 comprises a lock lever 69 and a solenoid 70. The lock lever 69 engages an engaging roller 68 provided on a bottom surface of the main chassis 45. The solenoid 70 rotates the lock lever 69 to a locked position or an unlocked position.

The lock lever 69 comprises a bearing portion 69a, an arm 69c and a connecting arm 69d. The bearing portion 69a fits on a shaft 71 which is mounted on the frame member 44a of the sub-chassis 44. The arm 69c includes a claw portion 69b which engages the engaging roller 68 of the main chassis 45. The connecting arm 69d is connected to a plunger 73 driven by the solenoid 70. The solenoid 70 attracts the plunger 73 by being excited when the eject button 12 of the front bezel 11 is operated. An end of the plunger 73 is inserted into an opening formed in the connecting arm 69d of the lock lever 69.

The plunger 73 attracts the connecting arm 69d by an electromagnetic force of the solenoid 70. Accordingly, the lock lever 69 is urged in the direction G by a torsion spring (not shown in the figures). The lock lever 69 is locked by the claw portion 69b being engaged with the engaging roller 68 due to a spring force of the torsion spring. When the plunger 73 is attracted by the electromagnetic force of the solenoid 70, the lock lever 69 rotates in the direction H so that the claw portion 69b is disengaged from the engaging roller 68, resulting in unlocking of the lock lever 69.

A description will now be given of a tray pressing mechanism 75 which presses the tray 2 in the direction A when the tray lock mechanism 43 unlocks the lock lever 69 by an eject operation.

As shown in FIG. 16, the tray pressing mechanism 75 comprises an eject pressing member 77 and a coil spring 78. The eject pressing member 77 is mounted to a mounting portion 76 of the frame member 44a of the sub-chassis 44. The coil spring 78 urges the eject pressing member 77 in the direction B. The eject pressing member 77 includes guide slots 80 which extend in the directions A and B and receive respective guide pins 79 which are mounted on the mounting portion 76. Accordingly, the eject pressing member 77 is movable in the direction A or B.

One end of the coil spring 78 is engaged with an engaging portion 76a of the mounting portion 76, and the other end is engaged with an engaging portion 77a of the eject pressing member 77. An end of the eject pressing member 77 contacts a rear wall 45g of the chassis 45 due to a spring force of the coil spring 78 when the tray 2 is located at the disc exchanging position. That is, when the tray 2 is located at the disc loading position, the eject pressing member 77 is moved in the direction B against the spring force of the coil spring 78, and thereby the eject pressing member 78 presses the rear wall 45g of the chassis 45 by the spring force of the coil spring 78.

Figure 17:
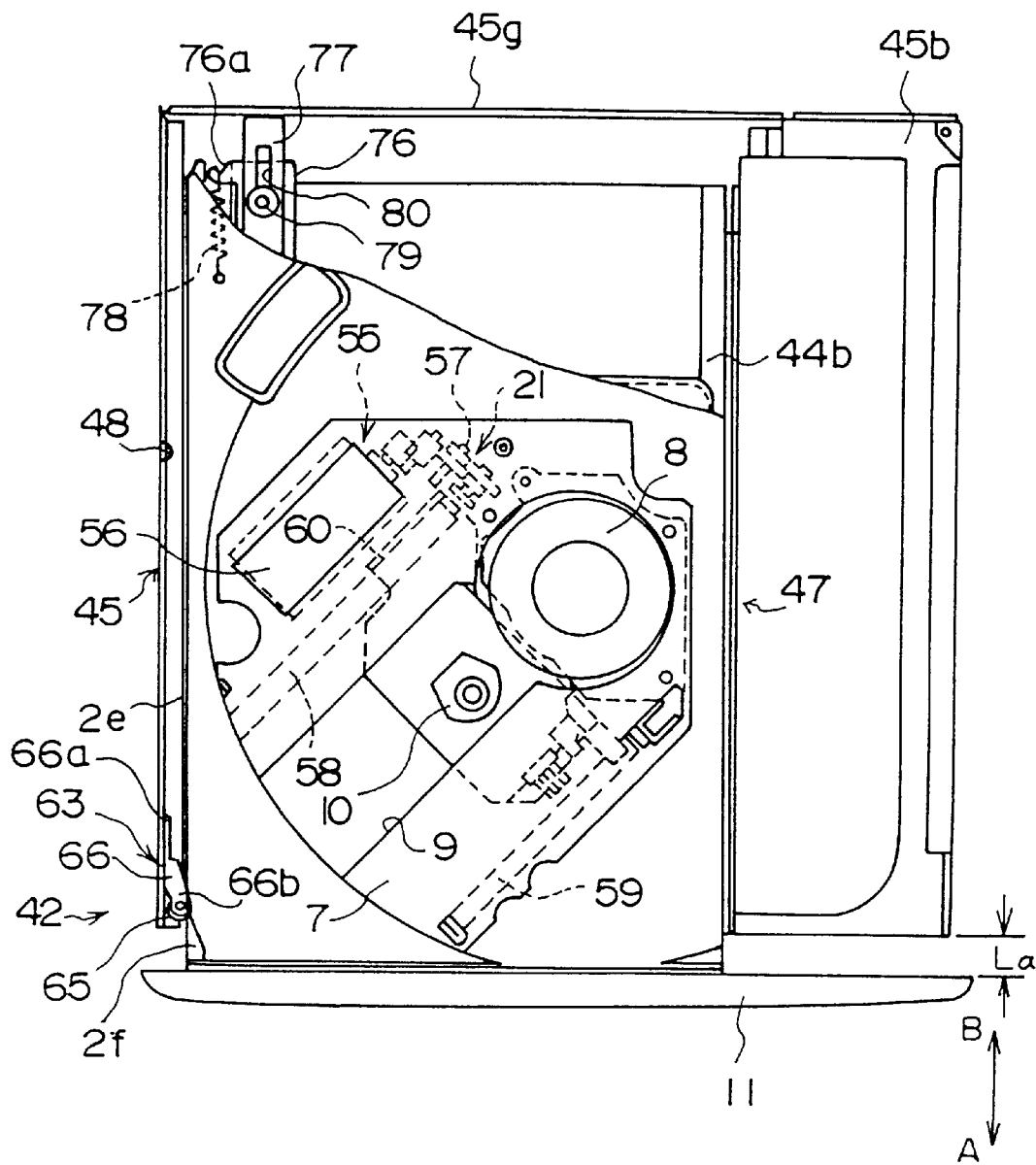
FIG. 17 is a plan view of the link mechanism when the tray is moved out by a predetermined distance.

Accordingly, when the locking of the tray lock mechanism 43 is released, the sub-chassis 44 and the tray 2 are moved in the direction A by a predetermined distance La as shown in FIG. 17 due to a reaction force caused by the eject pressing member 77 pressing the rear wall 45g of the main chassis 45.

As a result, the tray 2 which is provided on the sub-chassis 44 is moved in the direction A by the distance La which condition facilitates a drawing operation of the tray 2. Then, when the front bezel 11 is drawn manually in the direction A, the tray 2 moves to the disc exchanging position.

A description will now be given of an operation of the CD-ROM drive apparatus 1.

In the apparatus 1 before a disc is loaded, the tray 2 is located inside the apparatus 1 as shown in FIGS. 5 to 8, 13 and 16. When the tray 2 is located inside the apparatus 1, the lock lever 69 of the tray lock mechanism 43 provided on the sub-chassis 44 is engaged with the engaging roller 68 of the main chassis 45. Additionally, as shown in FIG. 16, the roller 65 of the engaging member 63 fits in the recess 2f of the tray 2, and the tray 2 and the sub-chassis 3 are maintained at the loading position inside the apparatus 1.

In the state in which the tray 2 is located inside the apparatus 1, when the eject button 12 of the front bezel 11 is operated, the plunger 63 is attracted by an electromagnetic force of the solenoid 70, and thus the lock lever 69 rotates in the direction H about the shaft 71. Thus, the lock lever 69 is disengaged from the engaging roller 68, resulting in the unlocked state.

Then, when the locking of the sub-chassis by the tray lock mechanism 43 is released, the eject pressing member 77 presses the rear wall 45g of the main chassis 45 by the spring force of the coil spring 78. Accordingly, the sub-chassis 44 and the tray 2 start to move in the direction A due to the reaction force.

The roller 65 of the engaging member 63, which fits in the recess 2f of the tray 2, rolls along a slanting portion of the recess 2f and contacts the side wall 2e of the tray 2 after the eject pressing member 77 starts to press the rear wall 45g of the main chassis 45.

Accordingly, as shown in FIGS. 3, 4 and 17, the sub-chassis 44 and the tray 2 move to positions in which the front bezel 11 protrudes from the front end of the housing 3 by the predetermined distance La so that the tray 2 can be drawn.

Figure 18:
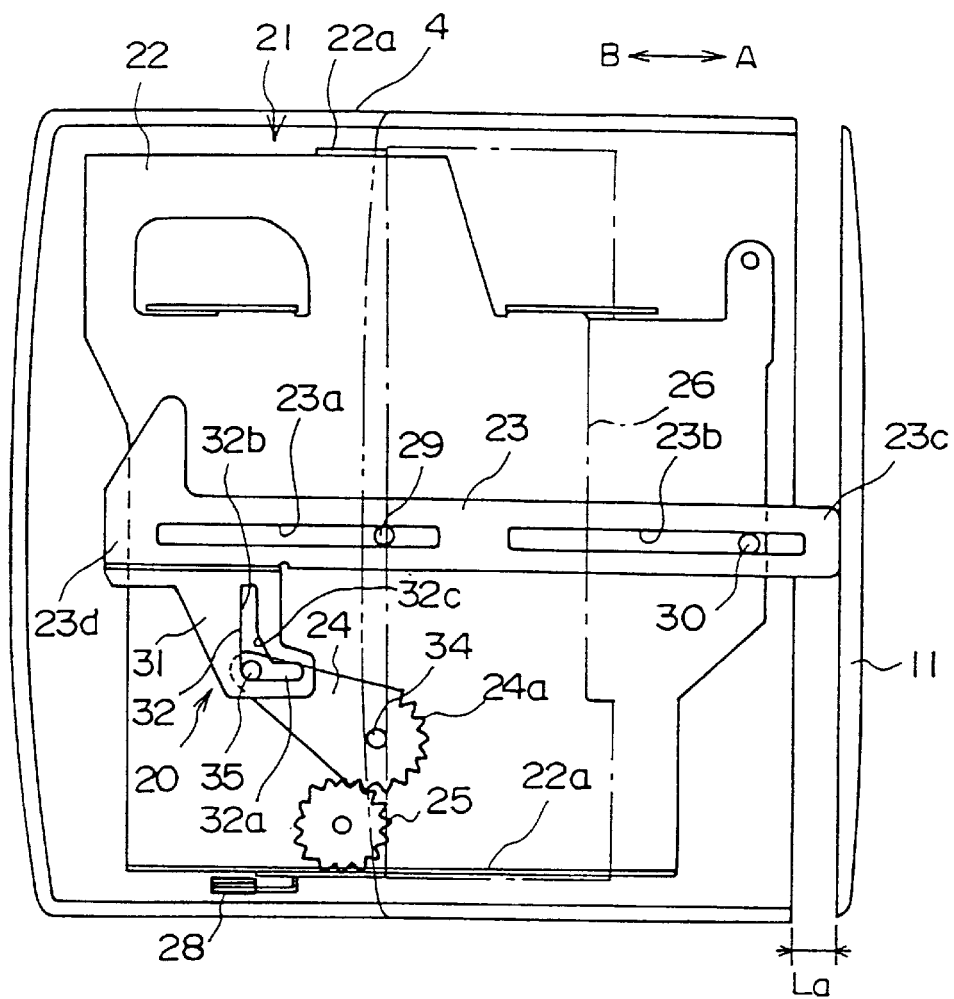
FIG. 18 is a plan view of the link mechanism when the tray is moved out by the predetermined distance.
Figure 19:
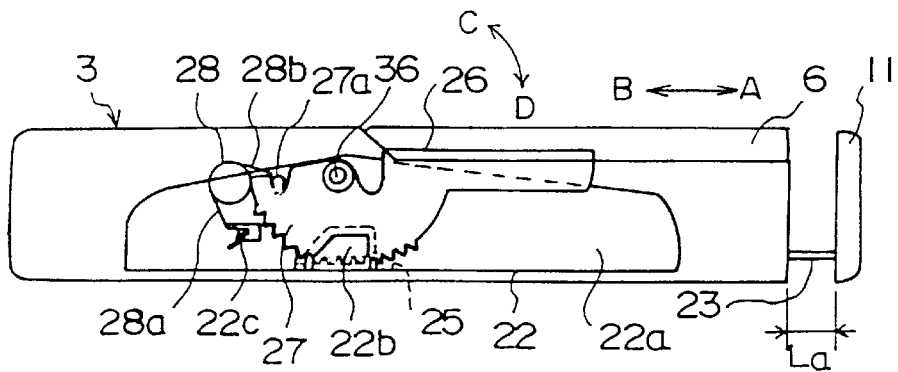
FIG. 19 is a side view of the link mechanism when the tray is moved out by the predetermined distance.

At this time, as shown in FIGS. 18 and 19, in the link mechanism 21, the pin 35 of the arm member 24 moves in the direction B relative to the second cam groove 32. Thereby, the pin 35 is moved into the second cam groove 32b, and thus the arm member 24 is allowed to rotate in the clockwise direction in FIG. 18. Accordingly, the locking action for the arm member 24 by the cam groove 32 and the pin 35 is released.

It should be noted that since the cover frame 26 urged in the direction D (closing direction) in FIG. 19 due to a spring force of the torsion spring 28, the open/close cover 28 is maintained at the closed position.

Thereafter, when the front bezel 11 is manually drawn in the direction A, the movable side rails 49 of the guide rail mechanisms 47 and 48 slide along the slide rails 51 in the direction A, and the slide rails 51 slide along the fixed side rails 50 in the direction A.

Figure 20:
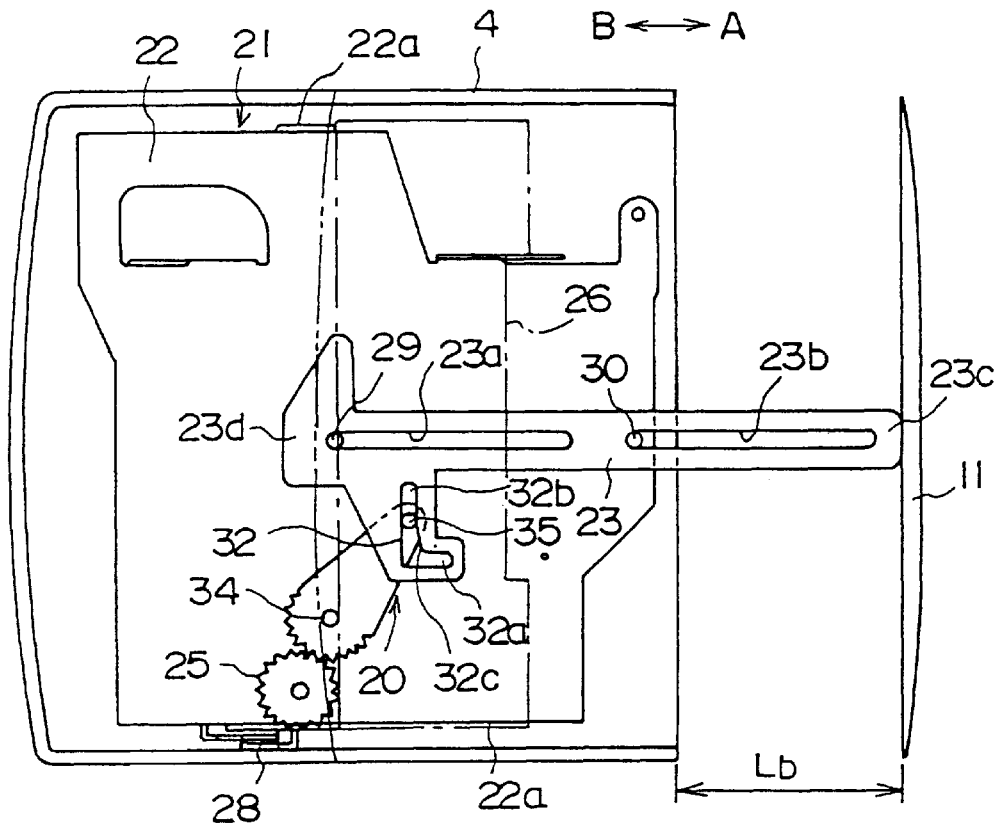
FIG. 20 is a plan view of the link mechanism when the tray is moved to a disc changing position.
Figure 21:
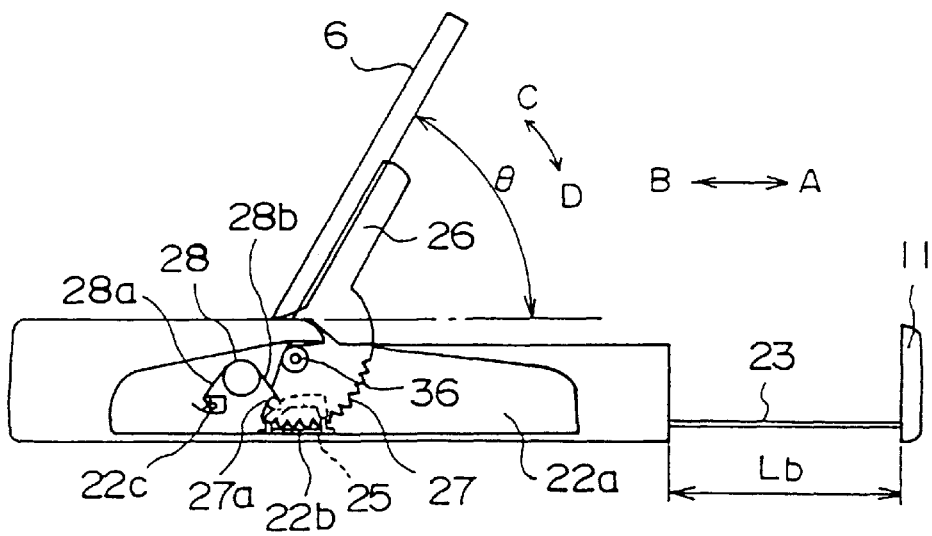
FIG. 21 is a side view of the link mechanism when the tray is moved to the disc changing position.

When the front bezel 11 is drawn further in the direction A, the sub-chassis 44 and the tray 22 slide in the direction while being guided by the pair of guide rail mechanisms 47 and 48. Since the roller 65 of the engaging member 63 rolls on the side wall 2e of the tray 2 while being pressed against the side wall 2e during the sliding operation in the direction A, a play of the tray 2 in the side directions is eliminated, resulting in a stable and smooth sliding operation. Additionally, since the guide rail pressing member 46 presses the sub-chassis 44 in the direction X, a play of the tray 2 in the side direction is eliminated, resulting in a smooth drawing operation of the tray 2. As shown in FIGS. 20 and 21, in the link mechanism 21, the slide member 23 connected to the front bezel 11 moves in the direction A, and the pin 35 moves in the second cam groove 32b, resulting in the rotation of the arm member 24 in the clockwise direction. The rotation of the arm member 24 is transmitted to the frame gear 27 via the transmission gear 25 which is engaged with the gear 24a of the arm member 24. Accordingly, the cover frame 26 having the frame gear 27 rotates in the direction C.

Accordingly, by being linked with the drawing operation of the tray 2 in the direction A, the open/close cover 6 which is fixed to the cover frame 26 rotates in the opening direction so that a space above the tray 2 is opened. Then, as the tray 2 is moved in the direction A, the engaging portion 27a of the frame gear moves downwardly below the line connecting the shaft 36 and the engaging portion 2c. At this time, the spring force of the torsion spring 28 acts to urge the engaging portion 27a of the frame gear 27 in the counterclockwise direction about the shaft 36.

Accordingly, the open/close cover 6 mounted to the cover frame 26 is urged in the opening direction by the spring force of the torsion spring 28 as shown in FIGS. 2 and 22, and the torsion spring 28 maintains the open/close cover 6 at the full open position so that the open/close cover 6 does not rotate in the closing direction.

As mentioned above, since the open/close cover 6 opens by being linked with the movement of the tray 2 in the direction A, the disc placing portion 7 of the tray 2 is exposed in the state where the disc can be exchanged despite the travel distance of the tray 2 being short.

As shown in FIGS. 20 and 21, when the tray 2 moves to the disc exchanging position, the guide pins 29 and 30 contact ends of the elongated openings 23a and 23b, the guide pins being provided in the center portion of the base 22. Thereby, a movement of the tray 2 in the direction A at the disc exchanging position is restricted.

As mentioned above, since the open/close cover 6 opens by being linked with the movement of the tray 2 in the direction A, the disc placing portion 7 of the tray 2 is exposed in the state where the disc can be exchanged despite the travel distance of the tray 2 being short. After the disc is exchanged, the tray 2 can be returned to the disc loading position by rotating the cover 6 in the closing direction or by pressing the tray 2 in the direction B since the open/close movement of the open/close cover 6 is linked with the movement of the tray 2 by the link mechanism 21.

For example, if the open/close cover 6 is pressed in the closing direction, the tray 2 and the front bezel 11 are retracted in the direction B. Thus, the tray 2 moves in the direction B and returns to the disc loading position shown in FIGS. 3, 4 and 7 by being guided by the pair of guide rail mechanisms 47 and 48.

Thereafter, as shown in FIGS. 9 and 10, in the link mechanism 21, the open/close cover 6 is pressed in the closing direction and the cover frame 26 rotates in the direction D, the frame gear 27 of the cover frame 26 rotates in the direction D. Thereby, the rotation of the open/close cover in the closing direction is transmitted to the gear 24a via the transmission gear 25 which engages the frame gear 27, and thus the arm 24 rotates in the counterclockwise direction.

As shown in FIGS. 18 and 19, since the pin 35 presses the second cam groove 32b in the direction B when the arm member 24 rotates in the counterclockwise direction, the slide member 23 connected to the front bezel 11 is moved in the direction B, and the tray 2 is also moved in the direction B, resulting in the state shown in FIGS. 3, 4 and 17.

Thereafter, when the front bezel 11 is pressed in the direction B, the pin 35 provided on the arm member 24 moves to the end of the first cam 32a. Thus, the tray 2 returns to the disc loading position, and a rotation of the arm member 24 is restricted.

Then, as the tray 2 is moved in the direction B, the engaging portion 27a of the frame gear 27 is moved to the upper side of the line connecting the shaft 36 and the engaging portion 22c. At this time, the open/close cover 6 mounted to the cover frame 26 is urged in the closing direction by the spring force of the torsion spring 28. That is, the torsion spring 28 presses and maintains the open/close cover 6 at the closed position so that the open/close cover 6 does not rotate in the opening direction. Accordingly, the tray 2 is maintained at the disc loading position.

Additionally, when the tray 2 moves in the direction B, the roller 65 rolls on the side wall 2e of the tray 2 while being pressed against the side wall 2. Thus, a play of the tray 2 in the side directions is eliminated which results in a stable and smooth operation of the tray 2.

When the tray 2 reaches the disc loading position, the roller 65 of the engaging portion 63 falls into the recess 2f of the tray 2 with a flip action. At the same time, the lock lever 69 of the tray lock mechanism 43 which is urged in the direction G engages the engaging roller 68 of the main chassis 45. Accordingly, the fact that the tray 2 reaches the disc loading position can be recognized by a feel of the flip action caused by the roller 65 of the engaging member 63 falling into the recess 2f of the tray 2.

In the above-mentioned embodiment, although the tray 2 is moved in the direction A by the rotation of the lock lever 69 in the direction of unlocking which is caused by the excitation of the solenoid 70 by the operation of the eject button 12, the lock lever 69 may be moved in the unlocking direction by an operation of a slide type eject button which is substituted for the eject button 12 so as to generate a slide motion to unlock the lock lever 69. In this case, the solenoid 70 is not needed, and thus manufacturing cost can be reduced.

It should be noted that the present invention is not limited to the CD-ROM drive apparatus, and may be applied to other apparatuses using a disk-like recording medium such as a compact disc (CD), a magnetic disc, a magneto-optical disc or an optical disc. Additionally, the present invention may be applied to a portable CD apparatus.

The present invention is not limited to the specifically disclosed embodiments, and variations and modifications may be made without departing from the scope of the present invention.

What is claimed is:

1. A disc apparatus comprising:

a tray movable between a first position and a second position, said tray being located in said disc apparatus so that a disc placed on said tray is loaded to said disc apparatus when said tray is at said first position, a portion of said tray being drawn from said disc apparatus so that the disc can be placed on said tray when said tray is at said second position and also removed from said tray when said tray is at said second position;

a rotatable cover provided above said tray so as to enclose said tray when said tray is at said first position, said cover having a rotatable shaft with a gear provided on the periphery of said shaft;

a cover opening mechanism which opens said cover by being linked with a first movement of said tray in a direction from said first position to said second position, wherein said cover opening mechanism comprises:

a slide member having a cam portion and being connected with said tray to be movable from said first position to said second position by being linked with said first movement of said tray; and a rotatably supported arm having an engaging portion on one end thereof and a gear portion on the other end thereof, said engaging portion being engaged with said cam portion, said gear portion being directly or indirectly engaged with said gear on said shaft.

2. The disc apparatus as claimed in claim 1, further comprising:

an engaging mechanism which holds said tray at said first position;

a switch adapted to be operated by a user;

a disengaging mechanism which releases an engagement of said tray by said engaging mechanism, the engagement being released when said switch is operated; and a tray pushing mechanism which extrudes a part of said tray when the engagement of said tray is released so as to facilitate said tray being drawn by the user.

wherein said cover opening mechanism also closes said cover by being linked with a second movement of said tray in a direction from said second position to said first position, and said cam portion includes a non-operating portion which does not act when said tray is being extruded by said pushing mechanism so that said cam portion acts only when said tray is being drawn by the user.

3. The disc apparatus as claimed in claim 2, wherein said cover opening mechanism includes a cover locking mechanism which restricts an opening operation of said cover when said tray is located at said first position.

4. The disc apparatus as claimed in claim 2, wherein said cover opening mechanism includes a cover urging mechanism which urges said cover toward a closed position when said tray is located at said first position and urges said cover toward a full open position when said tray is located at said second position.

5. The disc apparatus as claimed in claim 1, wherein said cover is opened by a rotating movement generated by said cover opening mechanism.

6. The disc apparatus as claimed in claim 1, wherein said cover opening mechanism includes:

a first gear member mounted to said cover;

a cam groove provided on said tray; and a second gear member engaged with said first gear member, said second gear member having a pin being engaged with said cam groove so as to generate a rotation of said second gear member.

7. The disc apparatus as claimed in claim 1, wherein said tray is provided with a turntable, a motor for rotating said turntable and a clamp mechanism which clamps the disc on said turntable.

* * * * *